United States Patent [19]

Koerner

[11] 3,753,746

[45] Aug. 21, 1973

[54] PERMEABLE REFRACTORY PRODUCTS

[76] Inventor: Otto Koerner, Rothstrasse 1062, Wiesbaden, Germany

[22] Filed: Jan. 15, 1971

[21] Appl. No.: 106,709

Related U.S. Application Data

[63] Continuation-in-part of Ser. No. 676,061, Oct. 18, 1967, abandoned.

[30] Foreign Application Priority Data

Oct. 19, 1966 Great Britain.................... 46,850/66

[52] U.S. Cl..................... 106/58, 106/40 R, 106/65, 106/67
[51] Int. Cl............................................. C04b 35/04
[58] Field of Search .................. 106/57, 58, 65, 67, 106/40

[56] References Cited
UNITED STATES PATENTS
2,007,052   7/1935   Howe.................................. 106/67

FOREIGN PATENTS OR APPLICATIONS
714,478   7/1965   Canada............................... 106/57

*Primary Examiner*—James E. Poer
*Attorney*—Brumbaugh, Graves, Donohue & Raymond

[57] ABSTRACT

A porous refractory body, primarily a porous plug for the refractory lining of a vessel containing molten metal through which plug gas can be blown into the metal. This body has a cold crushing strength of not less than 200 kg/cm$^2$ and consists of a coarse-grained refractory material with a minimum quantity of a suitable binding agent, and has permeable pores of a cross section not less than 0.05 mm and a gas permeability of at least 100, and preferably more than 500 nanoperm. The hot bending strength or modulus of rupture of the body at 1,400° C is from 20 – 60 kg/cm$^2$. The refractory material is mixed with the binding agent, and the mixture is compressed with a pressure of at least 300 kg/cm$^2$ before firing to bring substantially all of the grains into contact with adjacent grains.

10 Claims, 2 Drawing Figures

PATENTED AUG 21 1973 3,753,746

INVENTOR.
OTTO KOERNER
BY Brumbaugh Graves
Donohue & Raymond
his ATTORNEYS

PERMEABLE REFRACTORY PRODUCTS

This is a continuation-in-part of my copending U.S. Application Ser. No. 676,061, filed Oct. 18, 1967, now abandoned.

BACKGROUND OF THE INVENTION

This invention relates to high strength refractory bricks, blocks, plugs and the like which are also highly permeable to the passage of gases and vapors and to methods of manufacturing such refractory products. Such products in the form of plugs are, for example, used to blow gases under pressure into vessels containing molten metals and, in particular, into molten steel for the purpose of agitating the liquid metal and removing undesirable impurities from it, or for providing an efficient reaction between the small gas bubbles and the molten metal.

The above object could, however, not be attained in a satisfactory manner before the present invention. Known refractory products with a high permeability to gases were mechanically too weak to stand up to the severe conditions of a high temperature metal bath. On the other hand, refractory products having sufficient mechanical strength and resistance to chemical attack were not sufficiently permeable to gases.

As described in detail hereinafter, the porous refractory body of the present invention has a combination of greater mechanical strength and greater permeability to gases than the porous refractory bodies of the prior art, such as those described, for example, in the U. S. Pat. to Howe, No. 2,007,052, and in the U. S. Pat. to Langrod, No. 2,463,979.

Examples 1 and 2 given below illustrate the properties of prior art refractory bodies manufactured in accordance with the Howe and Langrod patent disclosures, respectively.

Example 1

"Coarse-grained" corundum with grain sizes of 0.1 to 1 mm and 1 to 2 mm was used as the refractory material to insure high permeability in the refractory body formed therefrom.

The binder material used consisted of a clay relatively low in alumina mixed with another clay relatively high in its iron oxide content (so-called Engobe Clay) and with small additions of CaO, MgO and alkali. This mixture gives a chemical composition which is quite similar to the one mentioned by Howe on page 2, right column, lines 60 to 65, as is shown by the following table:

measured in nanoperm. One nanoperm equals $10^{-9}$ perm. A permeability of 1 perm is defined by a flow volume of 1 cc per $cm^2$ per second through a permeable body of 1 cm thickness under a pressure of 1 dyne per $cm^2$ for a fluid having a viscosity of 1 poise.

Four different mixtures were prepared according to the following table which also records all the relevant test results:

TABLE I

| Mixture | 1 | 2 | 3 | 4 |
|---|---|---|---|---|
| Corundum (percent): | | | | |
| 1-2 mm, grain size | 50 | 100 | 50 | 100 |
| 0.5-1 mm, grain size | 50 | | 50 | |
| Binder material* | +5 | +5 | +10 | +10 |
| Water* | +2 | +2 | +3 | +3 |
| Grain size distribution of mixture (percent): | | | | |
| 2-3 mm | 6 | 13 | 7 | 9 |
| 1-2 mm | 43 | 78 | 41 | 78 |
| 0.5-1 mm | 40 | 3 | 38 | 3 |
| 0.09-0.5 | 6 | 1 | 5 | 1 |
| Below 0.09 | 5 | 5 | 9 | 9 |
| Properties of refractory body: | | | | |
| Linear expansion during firing (percent) | +0.03 | +0.03 | +0.03 | +0.03 |
| Bulk density | 2.46 | 2.45 | 2.53 | 2.47 |
| Specific gravity | 3.91 | 3.90 | 3.83 | 3.84 |
| Total porosity (percent) | 37.1 | 37.2 | 33.9 | 35.7 |
| Permeability (nanoperm) | 1,220 | 850 | 1,210 | 960 |
| Cold crushing strength ($kg./cm.^2$) | 580 | 490 | 1,090 | 730 |
| Modulus of rupture ($kg./cm.^2$) | | | | |
| At 1,200° C | 5 | 4 | 6 | 9 |
| At 1,400° C.** | 0 | 0 | 0 | 0 |

\* Weight added is percent by weight based on weight of corundum.
\*\* All samples collapsed under their own weight.

The table shows that the four samples have suitable porosity and crushing strength but none of them exhibits the hot bending strength (modules of rupture) at high temperature which is required for porous refractory materials used for permeable plugs. As shown in Table I, the bending strength of the Howe material is exceedingly low at 1,200° C and zero at 1,400° C.

It will be seen that the cold crushing strength is higher for the samples with the higher content of binder material. On the other hand, the samples containing the 0.5 to 1 mm corundum fraction have the higher permeability.

The overall result is that all four samples would be totally unsuitable for use as permeable bricks in vessels containing molten steel.

Example 2

The preparation of a refractory material, according to the Langrod specification, and results of the fired specimens are given below:

Mixture:

80 percent by weight calcined alumina (calcined at

|  | $SiO_2$ | $Al_2O_3$ | $Fe_2O_3$ | MgO | CaO | $Na_2O$ | $K_2O$ | $TiO_2$ |
|---|---|---|---|---|---|---|---|---|
| Binder material according to Howe | 64.3 | 19.3 | 4.6 | 2.1 | 3.7 | 1.3 | 3.8 | 0.9 |
| Binder material used in comparison tests | 67 | 19 | 5.0 | 2.2 | 3.7 | 1.2 | 3.6 | 1.1 |

The refractoriness of the Howe test binder material corresponded to Seger Cone 16 (firing temperature of 1,445° C). The corundum material was mixed with 5 or 10 percent (by weight) of the binder material and the usual addition of water. The mass was pressed under a pressure of 200 $kg/cm^2$, was dried and was finally fired at 1,300° C for a period of 4 hours. The gas permeability (as defined by German Standard DIN 51058) was 1,200° C), substantially over 200 mesh size (0.074 mm);

20 percent by weight calcined alumina milled with water in the form of a slurry in a ball mill for 12 hours.

Preparation of Refractory

The mixture was compressed into samples 125 × 60 mm on a hydraulic press. The pressure was about 900 kg/cm² which corresponded to the Langrod specification which stated the pressure should be "about 6 tons per square inch."

Drying:
   3 days in the open air and
   3 days at 150° C
Firing:
   1,550° C for 4 hours
Properties:
   The fired brick samples had a white color and several fissures across the edges.

| | |
|---|---|
| Firing shrinkage | 4% linear |
| Bulk density | 2.34 g/cm³ |
| Specific gravity | 3.96 |
| Porosity | about 40% |
| Permeability | 0.3 nanoperm |
| Permeable pore size (determined by the method of Washburn) | below 0.003 mm |
| Cold crushing strength | 990 kg/cm² |

It can be seen that although the porosity of the Langrod specimens was high, the gas permeability was extremely low so as to make them completely useless for gas blowing. The relatively high firing shrinkage was detrimental to the production of alumina refractory bricks.

It is an object of the present invention to overcome the shortcomings of the refractory bodies of the prior art.

SUMMARY OF THE INVENTION

The present invention provides a porous refractory body having a high bending strength as well as a high porosity. More particularly, the body has a cold crushing strength of not less than 200 kg/cm², comprising a coarse grained refractory material sintered with a minimum quantity of a suitable binding agent. The body has permeable pores of a cross section of not less than 0.05 mm and a gas permeability of at least 100 and preferably more than 500 nanoperm (npm). The hot bending strength, or modulus of rupture, of the body at 1,400° C is at least 20 – 30 kg/cm². When materials rich in aluminum oxide are used to form the refractory body, as will be described below, the modulus of rupture is about 50 – 60 kg/cm² at 1,400° C.

BRIEF DESCRIPTION OF THE DRAWINGS

The drawings illustrate how a typical porous refractory body according to the present invention may be used.

DESCRIPTION OF THE PREFERRED EMBODIMENTS

Figure 1:
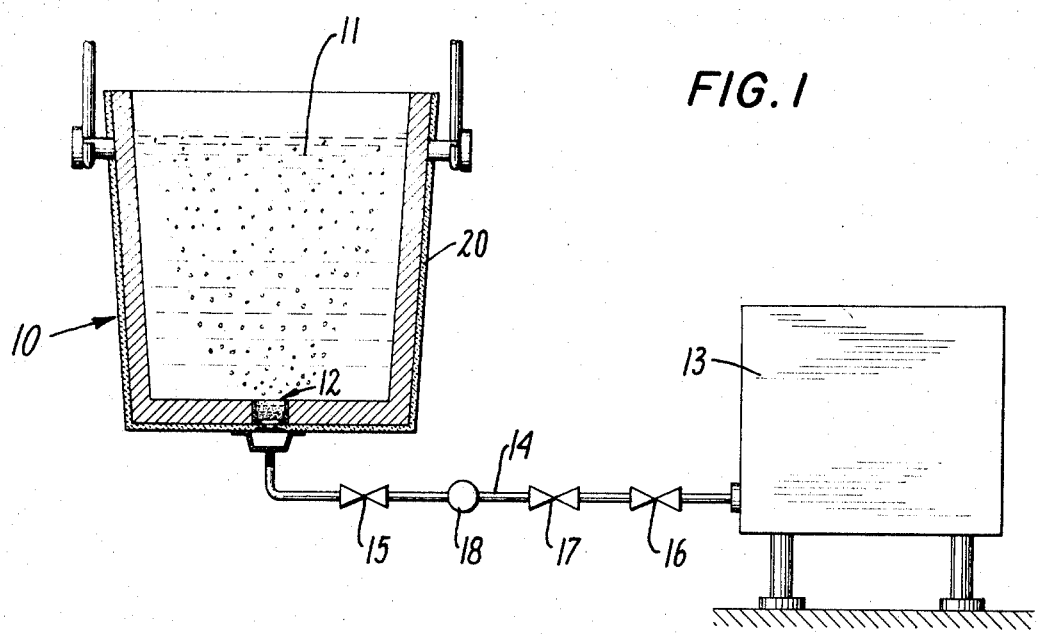
FIG. 1 shows schematically the introduction of argon or other gas into a ladle containing a molten metal through the porous refractory body of the present invention.

In a preferred embodiment, the coarse-grained refractory material of the present invention is a refractory oxide-containing material having at least 85 percent by weight of grain sizes of more than 0.5 mm with an addition of less than 10 percent by weight of a suitable refractory oxide-containing binding agent. To assure the advantage of the present invention, it is important that at least 30 percent of the binder comprises the same oxide mainly constituting the refractory material. For the purpose of introducing gases or vapors into molten metals the permeable pores should have an average cross section of 0.1 to 0.2 mm and a volume of 10 to 15 percent (as determined by the method of Washburn). It will be appreciated that the volume of the permeable pores may be only a fraction of the total porosity of such a body. Substantially all the grains in the body are in physical contact with, and are supported by, the surfaces of adjacent grains and the sintered binding agent joins the adjacent grains about their areas of contact while forming permeable pores between the grains.

The oxide-containing refractory body includes bricks, blocks, plugs, whether formed and fired at the factory or in situ. The materials preferably used in forming such bodies are refractory dead-burned (or fused) and coarse-grained neutral refractory substances, such as mullite and corundum, which are rich in aluminum oxide (alumina), or basic refractory materials, such as magnesia (magnesite).

The oxide-containing binding agent is a material having a refractory component which is used to join the refractory particles at their points or areas of contact. Binding agents preferably used in conjunction with the refractory granular materials rich in aluminum oxide (e.g., mullite and corundum) used in the present invention are refractory clays having a high aluminum oxide content. Finely dispersed alumina and water-soluble alumina, with or without the addition of clay, finely dispersed ceramic slurry of mullite, along with additions of a bond-activating agent, such as monoaluminum phosphate or chromium aluminum phosphate, also may be used. The latter two materials are preferably used together with alumina. When a basic refractory material, such as sintered magnesia, is used to form the refractory body, finely dispersed magnesia or caustic-burned magnesia is the binding agent with additions of small amounts of a bond-activating agent, such as finely grained chrome ore, the sesquioxides (e.g., $Fe_2O_3$, $Al_2O_3$, and $Cr_2O_3$), chrome salts, chromic acid or $B_2O_3$.

The binding agent is preferably composed of two essential components. The first is a highly refractory component comprising an oxide, such as alumina or magnesia, which is the same oxide mainly contained in the coarse-grained refractory material chosen. The second is a bond-activating agent, such as aluminum monophosphate, boric acid or iron oxide, etc., as set forth above. The ratio of refractory part to bond-activating agent is at least about 2:1. In other words, at least about 30 percent of the binding agent is the same oxide as that mainly contained in the refractory material.

Before firing, the formed bricks are compacted by subjecting them to a pressure of at least 300 kg/cm² and preferably more than 500 kg/cm² to force the grains into particle-to-particle contact. Accordingly, when the above-mentioned refractory materials and their binding agents are fired to form a porous refractory body, substantially all of the grains of the refractory material are supported by and are in contact with adjacent grains and their contact points are embedded in bridges of crystalline sintered material. It will be apparent that the high temperature bending strength of these sintered contact areas is mainly influenced by the character of the binding agents and the firing temperature. The use of refractory dead-burned and coarse-grained materials in predominant amounts in conjunction with a high degree of compression insures that the bodies have only a small burn shrinkage and that they are closely sized.

The following examples illustrate how refractory bodies having these characteristics can be manufactured in accordance with the present invention:

Example 3 (Porous Plug for Steel Casting Ladles)
Raw Material: Sintered mullite having the following granulation:

| | |
|---|---|
| 2.5 to 3.0 mm | 20% by wt. |
| 2.0 to 2.5 mm | 20% by wt. |
| 1.5 to 2.0 mm | 18% by wt. |
| 1.0 to 1.5 mm | 17% by wt. |
| 0.5 to 1.0 mm | 15% by wt. |
| 0.0 to 0.5 mm | 10% by wt. |

Binding Agents:
 a. Clay containing not less than 43 percent $Al_2O_3$: 3 percent by wt.
 b. Aluminum monophosphate (in the form of a 50 percent aqueous solution): 1.2 percent by wt.

The granulated mullite is mixed with the two binding agents which are added in a known manner as a slurry. The mixture is pressed into the desired shape under a pressure of about 600 kg/cm² and fired for 4 hours at 1,550° C.

The resulting physical properties of the plug are:

| | |
|---|---|
| Permeability | 400 npm |
| Open pore volume | 10% to 15% |
| Cold crushing strength | 400 kg/cm² |
| Hot bending strength (or Modulus of Rupture) | 63 kg/cm² at 1200°C and 56 kg/cm² at 1400°C |

Example 4 (Permeable Block for Use in Converters)
Raw Material: Sintered magnesia (0.3 percent $Fe_2O_3$) of the following granulation:

| | |
|---|---|
| 3.0 to 4.0 mm | 4% by wt. |
| 2.0 to 3.0 mm | 24% by wt. |
| 1.0 to 2.0 mm | 34% by wt. |
| 0.5 to 1.0 mm | 27% by wt. |
| 0.0 to 0.5 mm | 11% by wt. |

Binding Agents:
 a. Caustic magnesia   3 percent by wt.
 b. Boric acid   0.2 – 0.5 percent by wt. and/or
 c. Iron oxide   0.2 percent – 1.0 percent by wt.

The magnesia is mixed with the sintering agents in the conventional manner. The mixture is formed into blocks under a pressure of 900 kg/cm² and fired at 1,750° C.

The resulting physical properties of the block are:

| | |
|---|---|
| Permeability | 1080 npm |
| Cold crushing strength | 400 kg/cm² |

The hot bending strength of the permeable block made without the addition of boric acid is comparable to the strength of the plug manufactured according to Example 3.

Example 5 (Porous Brick for Casting Ladles)
Raw Material: Corundum with a grain size range of either 0.5 to 3 mm or 1 to 3 mm
Binding Agents:
 a. Clay containing not less than 43 percent $Al_2O_3$ (grain size of up to 0.25 mm) 5 percent by wt.
 b. Aluminum monophosphate (in the form of a 50 percent aqueous solution): 1.5 percent by wt.

The mixture is pressed at a pressure of 500 to 600 kg/cm² and fired for not less than 4 hours at a temperature of about 1,600° C.

The resulting physical properties are:

| | |
|---|---|
| Permeability | 500 to 700 npm |
| Cold crushing strength | 250 to 350 kg/cm² |

The hot bending strength is comparable to that of the plug manufactured according to Example 3.

Porous plugs according to Example 3 are suitable for flushing steel with argon in casting ladles prior to casting. One or more plugs are arranged within the refractory lining at the bottom of the ladle. These ladles contain up to 300 tons of steel, and 2 to 6 m³ of argon per ton may be used in the process which should not last longer than 10 minutes. This short time for the process is possible because a large volume of small gas bubbles can flush the liquid steel due to the highly permeable plugs. The agitation is strong enough to homogenize the molten metal in the ladle as well as equalize the temperature at various points in the molten metal. On the other hand, the upward momentum of the small gas bubbles is not strong enough to prevent a clean separation of slag and metal.

Porous blocks according to Example 4 are suitable for blowing oxygen and other gases into the molten pig iron of converters. Due to the high permeability of the block, oxygen can be blown at a sufficiently high volumetric rate so that a high quality output is maintained. The metallurgical reactions are much more efficient due to the very large surface of contact between the gas and metal and to the longer period of contact between them. Due to the very high refractoriness and mechanical strength of the blocks as well as the great evenness of the gas flow, the life of such blocks is very satisfactory.

It will be appreciated that the pore size of the body of the present invention can be adjusted according to the purpose for which it is used by varying the particle size of the granulated raw material. But in each case it is advantageous to exclude as far as possible grains below 0.05 mm and to use the smallest possible amount of binding or sintering agent. It has been found that this amount should be, if possible, less than about 5 percent but not less than about 3 percent.

For a given granular material of a given size range the relation between strength and permeability of the body formed by the present invention may be adjusted by varying the pressure with which the mixture is compacted prior to firing. By the way of example, the following variations may be obtained:

| Compacting pressure (kg/cm²) | 300 | 600 | 1000 |
|---|---|---|---|
| Cold crushing strength of fired brick (kg/cm²) | 200 | 400 | 500 |
| Permeability (nanoperm) | 1000 | 400 | 100 |

It is also possible to vary the particle size in the direction of the intended gas flow by adding several successive layers of increasing or decreasing particle size into the press mould. If the largest size is provided at the top, i.e., at the face to be in contact with the metal, this may improve permeability under actual conditions where the temperature of the gas increases during its passage through the porous material, and both its volume and viscosity increase substantially.

In the same way it is possible to improve the refractoriness and chemical resistance of the plug or block by using for the top layer a different material of exceptional quality.

Figure 2:
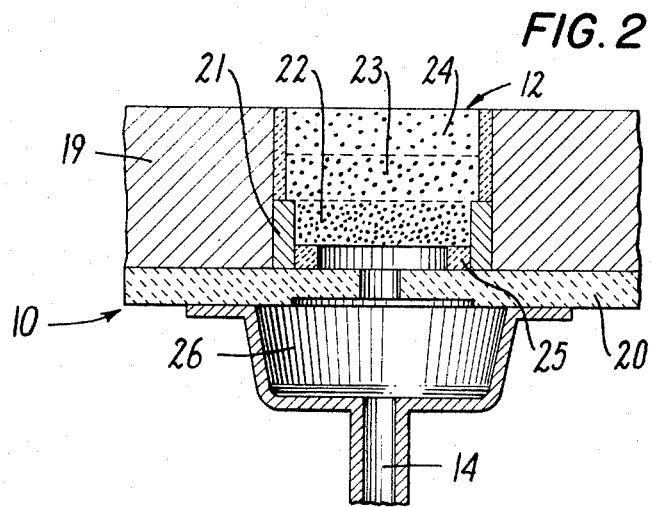
FIG. 2 is an enlarged schematic view of the portion of the ladle of FIG. 1 which holds the porous refractory body.

FIGS. 1 and 2 show the use of the porous refractory body of the present invention. FIG. 1 illustrates the introduction of argon gas into a casting ladle 10 which contains molten metal 11 through a porous refractory plug 12 in accordance with the invention. The gas is supplied to the ladle from a container 13 through a connecting pipe 14, three control valves 15, 16 and 17, and a flow meter 18. The porous refractory body 12 of the present invention is positioned at the bottom of the ladle 10 at the end of the pipe 14 so that the gas diffuses through it into the molten metal 11.

FIG. 2 is an enlarged view of the construction of the porous plug formed by the body of the invention. The porous refractory body 12 is placed in the refractory lining 19 of the ladle 10 which has a metal casing 20. In the illustrated embodiment, the porous body 12 is supported on a refractory base 21 and comprises three layers 22, 23 and 24, having progressively greater gas permeability. For this purpose, the layers are made with successively greater grain size so that the average grain size of the granular refractory material of the entire body 12 increases in one direction through the body. A refractory spacer 25 also supports a portion of refractory body 12. In operation, gas is fed through a pipe 14 into a pressure balancing chamber 26 located below the lining 20 and thence through the body into the ladle 10.

The refractory body according to the present invention therefore provides a strong porous plug, capable of withstanding the high temperature and pressure of molten metal while permitting gas to be blown into the metal from the bottom of the vessel containing the metal.

I claim:

1. A method for manufacturing a high strength porous refractory body comprising compressing a mixture which consists essentially of a granular material selected from the group consisting of oxide containing neutral and oxide containing basic refractory materials, said granular materials having at least 85 percent by weight of grains with a size of at least 0.5 mm, and no more than about 10 percent by weight of a refractory binder material which consists essentially of a refractory oxide component and a bond-activating agent component by applying thereto a pressure of at least 300 kg/cm² so as to control the permeability and strength of the resulting body, and sintering the mixture by firing the body at a high temperature to produce a refractory body having a cold crushing strength of no less than 200 kg/cm², a permeability of at least 100 nanoperm and a modulus of rupture of a greater than about 20 kg/cm² at 1,400° C.

2. A method according to claim 1 including the step of compressing the mixture by applying pressure such as to produce a refractory body having permeable pores with an average pore size of about 0.1 to 0.2 mm and a volume of about 10 percent to 15 percent of the body volume as measured by the Washburn method.

3. A method according to claim 1 wherein the granular material is selected from the group consisting of mullite, magnesia and corundum.

4. A method according to claim 1 wherein the binder includes a material selected from the group consisting of alumina and magnesia.

5. A method according to claim 1 wherein the granular material is selected from the group consisting of mullite and corundum, the binder is a material comprising aluminum oxide, and the bond-activating agent is selected from the group consisting of monoaluminum phosphate and chromium aluminum phosphate.

6. A method according to claim 1 wherein the granular material and binder comprise magnesia, the bond-activating agent is selected from the group consisting of chrome ore, the sesquioxides; chrome salts, chromic acid and boric acid.

7. A porous refractory body comprising at least about 90 percent by weight of a granular refractory material selected from the group consisting of oxide-containing neutral and oxide-containing basic refractory materials, at least about 85 percent by weight of the granular material having grain size greater than about one-half millimeter, substantially all of the grains being in physical contact with, and supported by, the surfaces of adjacent grains, and a sintered binding agent joining the adjacent grains of the body at their areas of contact and providing permeable pores therein having an average size of at least about 0.05 millimeter and a total volume of not less than about 10 percent of the body volume as measured by the Washburn method, at least about 30 percent of the binder agent comprising the same oxide mainly constituting the granular refractory material, whereby the body has a modulus of rupture of at least 20 kg/cm² at 1,400° C, a cold crushing strength of at least 200 kg/cm² and a permeability of at least 100 nanoperm.

8. A porous refractory body according to claim 7 comprising a plurality of successive layers having increasing particle size.

9. A porous refractory body according to claim 7 having a gas permeability of at least about 500 nanoperm.

10. A porous refractory body according to claim 7 wherein the granular refractory material is selected from the group consisting of mullite and corundum and the binding agent comprising refractory clay containing at least about 43 percent $Al_2O_3$.

* * * * *

UNITED STATES PATENT OFFICE
CERTIFICATE OF CORRECTION

Patent No. 3,753,746    Dated August 21, 1973

Inventor(s) Otto Koerner

It is certified that error appears in the above-identified patent and that said Letters Patent are hereby corrected as shown below:

On the title page, the identification of the Inventor [76], "Rothstrasse 1062, Wiesbaden, Germany" should read -- Rothstrasse 10, 62 Wiesbaden, Germany --. Column 1, line 51, "$TiO^Z$" should read -- $TiO_2$ --. Column 2, line 25, "9" should be -- 6 --. Column 8, line 55, "comprising" should be -- comprises --.

Signed and sealed this 29th day of January 1974.

(SEAL)
Attest:

EDWARD M. FLETCHER, JR.
Attesting Officer

RENE D. TEGTMEYER
Acting Commissioner of Patents